United States Patent [19]

Koyama

[11] Patent Number: 4,966,522
[45] Date of Patent: Oct. 30, 1990

[54] IN-TANK TYPE FUEL PUMP

[75] Inventor: Masahiro Koyama, Hyogo, Japan

[73] Assignee: Mitsubishi Denki Kabushiki Kaisha, Tokyo, Japan

[21] Appl. No.: 273,447

[22] Filed: Nov. 18, 1988

[30] Foreign Application Priority Data

Nov. 18, 1987 [JP] Japan .......................... 62-175911[U]

[51] Int. Cl.⁵ .............................................. F04D 29/70
[52] U.S. Cl. .................... 415/121.2; 417/313; 417/423.9; 210/172; 210/460
[58] Field of Search ............... 415/121.2; 417/366, 417/423.9, 313; 248/674, 300; 210/172, 460, 463

[56] References Cited

U.S. PATENT DOCUMENTS

| | | | |
|---|---|---|---|
| 1,909,578 | 5/1933 | Franke | 417/423.9 |
| 2,937,755 | 5/1960 | Szwargulski | 415/121.2 X |
| 2,997,957 | 8/1961 | Hall | 415/121.2 X |
| 3,029,774 | 4/1962 | Goettl | 415/121.2 |
| 3,612,721 | 10/1971 | Evans et al. | 417/61 |
| 4,224,161 | 9/1980 | Anderson et al. | 210/460 |
| 4,420,396 | 12/1983 | Yamamoto et al. | 210/460 |
| 4,586,880 | 5/1986 | Inao et al. | 415/121.2 X |
| 4,609,327 | 9/1986 | Nishimori | 415/121.2 |
| 4,617,121 | 10/1986 | Yokoyama | 210/460 |
| 4,682,936 | 7/1987 | Suzuki et al. | 417/423.9 X |
| 4,728,256 | 3/1988 | Araoka | 415/121.2 |
| 4,756,826 | 7/1988 | Horvath | 415/121.2 |

FOREIGN PATENT DOCUMENTS

| | | |
|---|---|---|
| 590340 | 1/1960 | Canada .......................... 415/121.2 |
| 0246755 | 11/1987 | European Pat. Off. . |
| 3721977 | 1/1989 | Fed. Rep. of Germany . |
| 799218 | 5/1890 | France ............................ 210/460 |
| 56-72286 | 6/1981 | Japan ............................. 415/121.2 |
| 593294 | 10/1947 | United Kingdom ............. 415/121.2 |
| 1139319 | 1/1969 | United Kingdom . |
| 1470987 | 4/1977 | United Kingdom . |
| 2070687 | 9/1981 | United Kingdom . |
| 2095751 | 10/1982 | United Kingdom . |

Primary Examiner—John T. Kwon
Attorney, Agent, or Firm—Sughrue, Mion, Zinn, Macpeak & Seas

[57] ABSTRACT

An in-tank type fuel pump installed in a fuel tank includes a suction inlet through which fuel is supplied from the fuel tank to the in-tank type fuel pump; a strainer coupled to the suction inlet and having a screen for removing foreign matter from the fuel; and a protective board provided on the bottom of the screen of the strainer for protecting the screen.

4 Claims, 1 Drawing Sheet

IN-TANK TYPE FUEL PUMP

BACKGROUND OF THE INVENTION

This invention relates to an "in-tank" type fuel pump installed in a fuel tank, and more particularly to an in-tank type fuel pump with a strainer screen protecting member.

FIG. 1 is a sectional side view showing a conventional in-tank type fuel pump. In FIG. 1, reference numeral 1 designates a fuel tank; 1a, tank top plate; 1b, a tank bottom plate; 1c, a mounting opening member; 2, a container fitted on the bottom plate 1b, for preventing the vibration of fuel; 2a, the bottom of the container 2; 3, a motor-driven fuel pump body comprising a suction inlet 3a, a discharge outlet 3b, an impeller 3c driven by an electric motor (not shown) to pump fuel, and a cylindrical yoke 3d; 4, a strainer having a coupling pipe 4a, a screen 4b formed by weaving nylon threads or the like, and a protector 4c for preventing the collapse of the screen 4b; and 5, a bracket used to fixedly secure the fuel pump body 3 in the fuel tank 1. The bracket 5 is supported through a cushion 6 of elastic material such as rubber in such a manner that a small gap is formed between the bottom of the strainer 4 and the fuel tank bottom plate 1b.

Furthermore, in FIG. 1, reference numeral 7 designates a fuel hose through which the discharge outlet 3b of the pump body 3 is coupled to an outlet pipe 8; and 9, a cover plate for closing the mounting opening member through a packing 10.

In the in-tank type fuel pump thus constructed, the impeller 3c is rotated by the electric motor (not shown), so that the fuel is supplied into the coupling pipe 4a while foreign matter is removed therefrom by the screen 4b of the strainer 4, and is then passed through the suction inlet 3a, the cylindrical yoke 3d, the discharge outlet 3b, the fuel hose 7, and the outlet pipe 8, thus finally being discharged out of the fuel tank 1.

The conventional in-tank type fuel pump described above suffers from a difficulty that, for example, when the motor vehicle in which it is installed vibrates, the strainer screen bottom may be damaged by being sandwiched between the protector and the container bottom. As a result, foreign matter such as iron power in the fuel tank contaminates the pump body, thus hindering or at worst, stopping the pumping function.

SUMMARY OF THE INVENTION

Accordingly, an object of this invention is to eliminate the above-described difficulty accompanying a conventional in-tank type fuel pump. More specifically, an object of the invention is to provide an in-tank type fuel pump in which the strainer screen is protected, and the hindering or stopping of the pumping function is prevented.

In an in tank fuel pump according to the present invention, a protective board is provided on the bottom of the strainer screen with the aid of the coupling pipe connected to the strainer, to prevent thereby the hindering or stopping of the pumping function.

In the in-tank type fuel pump of the present invention, the protective board provided on the bottom of the strainer screen prevents the bottom of the strainer screen from being brought directly into contact with the fuel tank bottom, thus preventing the hindering or stopping of the pumping function.

DETAILED DESCRIPTION OF THE PREFERRED EMBODIMENT

One preferred embodiment of this invention will be described with reference to the accompaying drawings.

Figure 1:
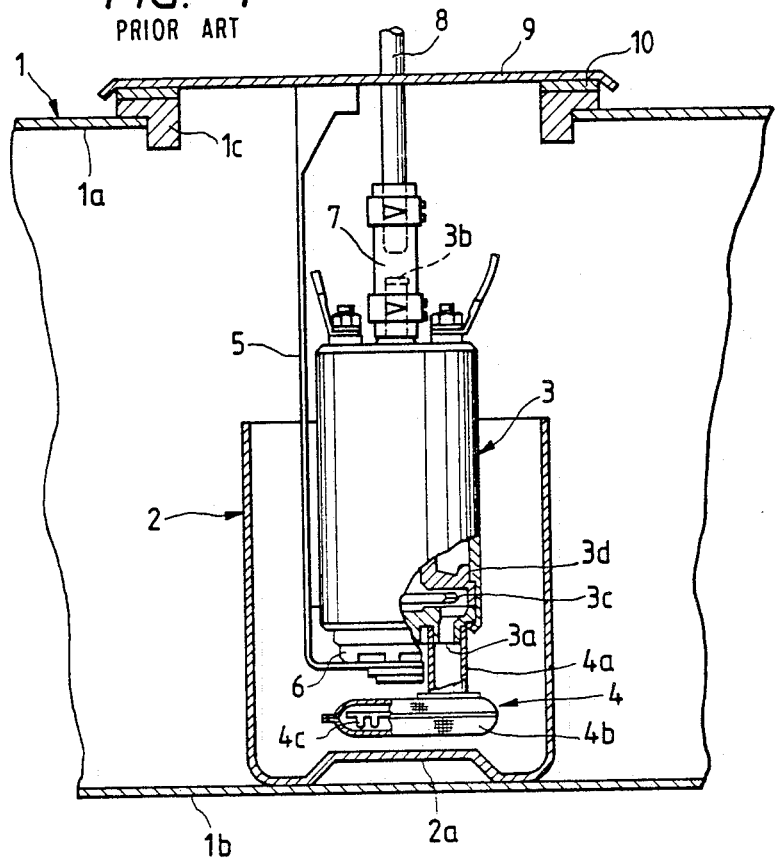
FIG. 1 is a sectional view showing a conventional in-tank type fuel pump.
Figure 2:
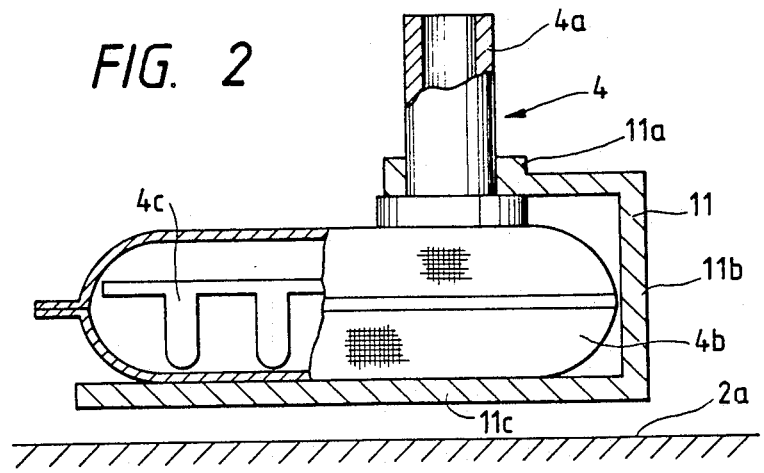
FIG. 2 Is a side view showing an in-tank type fuel pump according to an embodiment of the present invention.

FIG. 2 is a side view showing the embodiment of the invention. In FIG. 2, those components which have been previously described with reference to FIG. 1 are designated by the same reference numerals or characters. In FIG. 2, reference numeral 11 designates a protective board which is substantially U-shaped in form, and which can be made, for example, from a resin material. An upper portion 11a of the protective board 11 is fixedly mounted on the coupling pipe 4a of the strainer 4, and a lower portion 11c, which merges through a middle portion 11b with the upper portion 11a, is in contact with the bottom of the strainer screen 4b.

As described above, pump of the present invention, the protective board 11 is provided so that it is in contact with the bottom of the strainer screen 4b. Therefore, the in-tank type fuel pump of the invention is free from the above-described difficulty that, for example when the motor vehicle vibrates, the strainer screen bottom is damaged due to being sandwiched between the protector and the container bottom, resulting in foreign matter such as iron powder in the fuel tank contaminating the pump body, thus hindering or stopping the pumping function.

As described above, the in-tank fuel pump of the present invention has the protective board on the strainer screen bottom which prevents the strainer from being damaged; and, thereby prevents the hindering or stopping of the pumping function.

What is claimed is:

1. An in-tank type fuel pump installed in a fuel tank, comprising:
    suction inlet means through which fuel is supplied from said fuel tank to said in-tank type pump;
    strainer means coupled to said suction inlet means and having screen means for removing foreign matter from the fuel;
    protection means provided on the bottom of said screen of said strainer for protecting said screen; and
    a coupling pipe for connecting said strainer with said suction inlet in which said protection means comprises an upper portion thereof coupled to said coupling pipe, a middle portion thereof, and a lower portion thereof which merges through said middle portion to said upper portion, said lower portion being in continuous contact with the entire bottom of said screen means.

2. An in-tank type fuel pump as claimed in claim 1, wherein said protection means is made of resin.

3. An in-tank type fuel pump as claimed in claim 1, wherein said protection means has a single-piece U-shaped form.

4. An in-tank type fuel pump as claimed in claim 1, wherein a small gap is provided between all of said strainer means and the bottom of said fuel tank through said protection means.

* * * * *